US011233601B2

(12) United States Patent
Salah et al.

(10) Patent No.: US 11,233,601 B2
(45) Date of Patent: Jan. 25, 2022

(54) METHOD AND APPARATUS FOR DOWNLINK CONTROL INFORMATION SIZE ALIGNMENT IN MOBILE COMMUNICATIONS

(71) Applicant: MediaTek Singapore Pte. Ltd., Singapore (SG)

(72) Inventors: Abdellatif Salah, Cambridge (GB); Mohammed S Aleabe Al-Imari, Cambridge (GB)

(73) Assignee: MediaTek Singapore Pte. Ltd., Singapore (SG)

( * ) Notice: Subject to any disclaimer, the term of this patent is extended or adjusted under 35 U.S.C. 154(b) by 14 days.

(21) Appl. No.: 16/848,801

(22) Filed: Apr. 14, 2020

(65) Prior Publication Data

US 2020/0328840 A1 Oct. 15, 2020

Related U.S. Application Data

(60) Provisional application No. 62/833,861, filed on Apr. 15, 2019.

(51) Int. Cl.
*H04L 1/00* (2006.01)
*H04W 24/08* (2009.01)
*H04W 72/04* (2009.01)

(52) U.S. Cl.
CPC ............ *H04L 1/003* (2013.01); *H04L 1/0008* (2013.01); *H04W 24/08* (2013.01); *H04W 72/042* (2013.01)

(58) Field of Classification Search
CPC ..... H04L 1/003; H04L 1/0008; H04L 1/0038; H04L 5/001; H04L 1/0027; H04L 5/0008;
(Continued)

(56) References Cited

U.S. PATENT DOCUMENTS 9,031,016 B2 * 5/2015 Kim ........................ H04L 5/001
370/329
9,635,658 B2 4/2017 Papasakellariou et al.
(Continued)

FOREIGN PATENT DOCUMENTS

WO WO 2013129838 A1 9/2013
WO WO 2016036498 A1 3/2016
(Continued)

OTHER PUBLICATIONS

China National Intellectual Property Administration, International Search Report and Written Opinion for PCT/CN2020/084870, dated Jul. 10, 2020.
(Continued)

*Primary Examiner* — Jung Liu
(74) *Attorney, Agent, or Firm* — Han IP PLLC; Andy M. Han (57) ABSTRACT

Various solutions for downlink control information (DCI) size alignment with respect to user equipment and network apparatus in mobile communications are described. An apparatus may receive a configuration configuring a plurality of DCI formats. The apparatus may determine whether a number of DCI sizes of the DCI formats is greater than a DCI size budget. The apparatus may determine DCI sizes to monitor within the DCI size budget according to a DCI size alignment rule in an event that the number of DCI sizes is greater than the DCI size budget. The apparatus may monitor the DCI formats according to the determined DCI sizes.

16 Claims, 5 Drawing Sheets

(58) Field of Classification Search
CPC ... H04L 5/0094; H04L 5/0091; H04L 1/0045; H04L 5/0053; H04L 5/0023; H04L 1/00; H04L 5/0046; H04L 1/0039; H04W 24/08; H04W 72/042; H04W 48/12; H04W 24/02
See application file for complete search history.

(56) References Cited

U.S. PATENT DOCUMENTS

| | | | |
|---|---|---|---|
| 2013/0016655 A1* | 1/2013 | Heo | H04L 5/0053 370/328 |
| 2017/0019915 A1* | 1/2017 | Nogami | H04L 5/0053 |
| 2017/0094648 A1* | 3/2017 | Yang | H04L 5/0053 |
| 2017/0339681 A1* | 11/2017 | Hussain | H04L 1/0038 |
| 2018/0278314 A1 | 9/2018 | Nam et al. | |
| 2019/0297604 A1* | 9/2019 | Lee | H04W 72/1268 |
| 2019/0297607 A1* | 9/2019 | Kim | H04L 5/0053 |
| 2019/0313378 A1* | 10/2019 | Abdoli | H04W 72/042 |
| 2019/0357194 A1* | 11/2019 | Hwang | H04L 5/0044 |
| 2021/0067267 A1* | 3/2021 | Chen | H04L 1/00 |

FOREIGN PATENT DOCUMENTS

| | | |
|---|---|---|
| WO | WO 2018031928 A1 | 2/2018 |
| WO | WO 2019051096 A1 | 3/2019 |

OTHER PUBLICATIONS

Taiwan Intellectual Property Office, Office Action for Taiwan Patent Application No. 109112606, dated Oct. 6, 2021.

* cited by examiner

| DCI SIZES | SIZE_1 | SIZE_2 | SIZE_3 | SIZE_4 | SIZE_5 | SIZE_6 |
|---|---|---|---|---|---|---|
| DCI FORMATES | 0_1 | 0_2 | 1_0 | 1_1 | 1_2 | 2_0 |

101

| DCI SIZES | SIZE_1 | SIZE_3 | SIZE_4 | SIZE_5 | SIZE_6 |
|---|---|---|---|---|---|
| DCI FORMATES | 0_1 | 1_0 | 1_1 | 1_2, 0_2 | 2_0 |

102

| DCI SIZES | SIZE_3 | SIZE_4 | SIZE_5 | SIZE_6 |
|---|---|---|---|---|
| DCI FORMATES | 1_0 | 1_1, 0_1 | 1_2, 0_2 | 2_0 |

METHOD AND APPARATUS FOR DOWNLINK CONTROL INFORMATION SIZE ALIGNMENT IN MOBILE COMMUNICATIONS

CROSS REFERENCE TO RELATED PATENT APPLICATION(S)

The present disclosure is part of a non-provisional application claiming the priority benefit of U.S. Patent Application No. 62/833,861, filed on 15 Apr. 2019, the content of which being incorporated by reference in its entirety.

TECHNICAL FIELD

The present disclosure is generally related to mobile communications and, more particularly, to downlink control information (DCI) size alignment with respect to user equipment and network apparatus in mobile communications.

BACKGROUND

Unless otherwise indicated herein, approaches described in this section are not prior art to the claims listed below and are not admitted as prior art by inclusion in this section.

In New Radio (NR), new DCI formats are introduced to provide better flexibility for the scheduling of specific services. For example, ultra-reliable and low latency communications (URLLC) is supported for emerging applications that demands high requirements on end-to-end latency and reliability. A general URLLC reliability requirement is that a packet of size 32 bytes shall be transmitted within 1 millisecond end-to-end latency with a success probability of $10^{-5}$. To meet the stringent latency and reliability requirements, two extra DCI sizes (e.g., compact DCI) are introduced in Release-16 of $3^{rd}$ Generation Partnership Project (3GPP) specifications to mainly schedule the URLLC traffic. For example, DCI format 0_2 is proposed to schedule uplink data, and DCI format 1_2 is proposed to schedule downlink data.

An agreement was made in 3GPP to support the new DCI format with configurable size. For example, the maximum DCI size can be larger than the existing Release-15 DCIs. The minimum DCI size targets a reduction of 10~16 bits less than the DCI format size of the Release-15 DCIs. The DCI with configurable fields could be very beneficial. These fields could be configured with different bit widths depending on the applied scenario. For example, some fields (e.g., Multi-input Multi-output (MIMO) related fields) could be included in the enhanced URLLC (eURLLC) DCI when full functionality is supported. Therefore, new DCI format with configurable size and flexible fields is important to accommodate the URLLC/eURLLC service.

However, the new DCI formats should be designed carefully to not increase the PDCCH monitoring complexity and avoid any risk of confusion with the fallback and the non-fallback Release-15 DCIs. Adding new DCI sizes to monitor at the user equipment (UE) side will increase the total number of DCI sizes for monitoring and increases the complexity of the UE blind decoding. On the other hand, if a new DCI format is introduced and if the size of the new DCI (among the possible configurable sizes) could be similar or identical to the already existing DCI formats, then differentiation between the new DCI format and the other existing DCIs is not possible from UE perspective. Therefore, some restrictions are needed to avoid such issues to happen.

Accordingly, how to reduce PDCCH monitoring complexity and avoid the risk of confusion with the existing DCI formats is an important issue for the newly developed wireless communication network. It is needed to provide proper DCI size alignment rules and/or restrictions for reducing the UE design complexity.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to DCI size alignment with respect to user equipment and network apparatus in mobile communications.

In one aspect, a method may involve an apparatus receiving a configuration configuring a plurality of DCI formats. The method may also involve the apparatus determining whether a number of DCI sizes of the DCI formats is greater than a DCI size budget. The method may further involve the apparatus determining DCI sizes to monitor within the DCI size budget according to a DCI size alignment rule in an event that the number of DCI sizes is greater than the DCI size budget. The method may further involve the apparatus monitoring the DCI formats according to the determined DCI sizes.

In one aspect, a method may involve an apparatus determining that a number of DCI sizes is greater than a DCI size budget. The method may also involve the apparatus determining whether a first payload size of a first DCI format is less than a second payload size of a second DCI format. The method may further involve the apparatus adding a number of zero padding bits to the first DCI format until the first payload size of the first DCI format is equal to the second payload size of the second DCI format in an event that the first payload size of the first DCI format is less than the second payload size of the second DCI format. The method may further involve the apparatus transmitting the first DCI format with the zero padding bits.

In one aspect, a method may involve an apparatus determining whether a first payload size of a first DCI format is equal to a second payload size of a second DCI format. The method may also involve the apparatus appending a zero padding bit to the first DCI format in an event that the first payload size of the first DCI format is equal to the second payload size of the second DCI format. The method may further involve the apparatus transmitting the first DCI format with the zero padding bit.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT), Narrow Band Internet of Things (NB-IoT) and Industrial Internet of Things (IIoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to DCI size alignment with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

In NR, new DCI formats are introduced to provide better flexibility for the scheduling of for specific services. For example, URLLC is supported for emerging applications that demands high requirements on end-to-end latency and reliability. A general URLLC reliability requirement is that a packet of size 32 bytes shall be transmitted within 1 millisecond end-to-end latency with a success probability of $10^{-5}$. To meet the stringent latency and reliability requirements, two extra DCI sizes (e.g., compact DCI) are introduced in Release-16 of 3GPP specifications to mainly schedule the URLLC traffic. For example, DCI format 0_2 is proposed to schedule uplink data, and DCI format 1_2 is proposed to schedule downlink data.

An agreement was made in 3GPP to support the new DCI format with configurable size. For example, the maximum DCI size can be larger than the existing Release-15 DCIs. The minimum DCI size targets a reduction of 10~16 bits less than the DCI format size of the Release-15 DCIs. The DCI with configurable fields could be very beneficial. These fields could be configured with different bit widths depending on the applied scenario. For example, some fields (e.g., MIMO related fields) could be included in the eURLLC DCI when full functionality is supported. Therefore, new DCI format with configurable size and flexible fields is important to accommodate the URLLC/eURLLC service.

However, the new DCI formats should be designed carefully to not increase the PDCCH monitoring complexity and avoid any risk of confusion with the fallback and the non-fallback Release-15 DCIs. The Release-15 fallback DCI may comprise DCI format 0_0 and DCI format 1_0. The Release-15 non-fallback DCI may comprise DCI format 0_1 and DCI format 1_1. Adding new DCI sizes to monitor at the UE side will increase the total number of DCI sizes for monitoring and increases the complexity of the UE blind decoding. On the other hand, if a new DCI format is introduced and if the size of the new DCI (among the possible configurable sizes) could be similar or identical to the already existing DCI formats, then differentiation between the new DCI format and the other existing DCIs is not possible from UE perspective. Therefore, some restrictions are needed to avoid such issues to happen.

In view of the above, the present disclosure proposes a number of schemes pertaining to DCI size alignment and restrictions with respect to the UE and the network apparatus. It was agreed in Release-16 to keep the same DCI sizes budget as in Release-15. Thus, some DCI size alignment rules are proposed to limit the number of possible DCI sizes to monitor at the UE side. According to the schemes of the present disclosure, the total number of different DCI sizes configured to monitor for a UE will not exceed a predetermined number (e.g., 4) for a cell. Also, the total number of different DCI sizes with cell-radio network temporary identifier (C-RNTI) configured to monitor for a UE will not exceed a predetermined number (e.g., 3) for the cell. When the total number of different DCI sizes exceeds the predetermined number, the DCI sizes of different DCI formats may be aligned with each other to reduce the total number of different DCI sizes. On the other hand, when the DCI size of the new DCI format is identical to the DCI size of the existing DCI formats, one zero padding bit may be added to the new DCI format to differentiate the new DCI format from the existing DCI formats. Accordingly, the complexity of UE monitoring and blind decoding could be reduced, and the risk of confusion between the new DCI formats and the existing DCI formats could be avoided.

In NR, new DCI formats are introduced for scheduling the traffic of specific services (e.g., URLLC/eURLLC services). For example, DCI format 0_2 is proposed to schedule uplink data (e.g., physical uplink shared channel (PUSCH)), and DCI format 1_2 is proposed to schedule downlink data (e.g., physical downlink shared channel (PDSCH)). The new DCI formats may coexist with the existing DCI formats such as fallback DCI and non-fallback DCI. The fallback DCI may comprise DCI format 0_0 for scheduling PUSCH and DCI format 1_0 for scheduling PDSCH. The non-fallback DCI may comprise DCI format 0_1 for scheduling PUSCH or indicating downlink feedback information for configured grant PUSCH and DCI format 1_1 for scheduling PDSCH and/or triggering one shot hybrid automatic repeat request-acknowledgement (HARQ-ACK) codebook feedback. The fallback DCI may have fewer bits than the non-fallback DCI hence higher reliability and less scheduling flexibility. Therefore, the network node may need to configure multiple DCI formats to the UE. The UE may need to monitor different DCI formats with different DCI sizes.

Specifically, the network node may configure a plurality of DCI formats to the UE for UE's monitoring via a radio resource control (RRC) configuration. In order not to increase UE monitoring and blind decoding complexity, Release-15 and Release-16 5G NR defined a DCI size budget. The DCI sizes configured to monitor by the UE is up to 4 for a cell, and the total number of different DCI sizes with C-RNTI configured to monitor is up to 3 for a cell. Therefore, the network node determines whether a number of DCI sizes that it configured for UE's monitoring is greater than the DCI size budget. In an event that the number of DCI sizes is greater than the DCI size budget, the network node may be configured to apply/use a DCI size alignment rule to reduce the total number of different DCI sizes.

Figure 1:
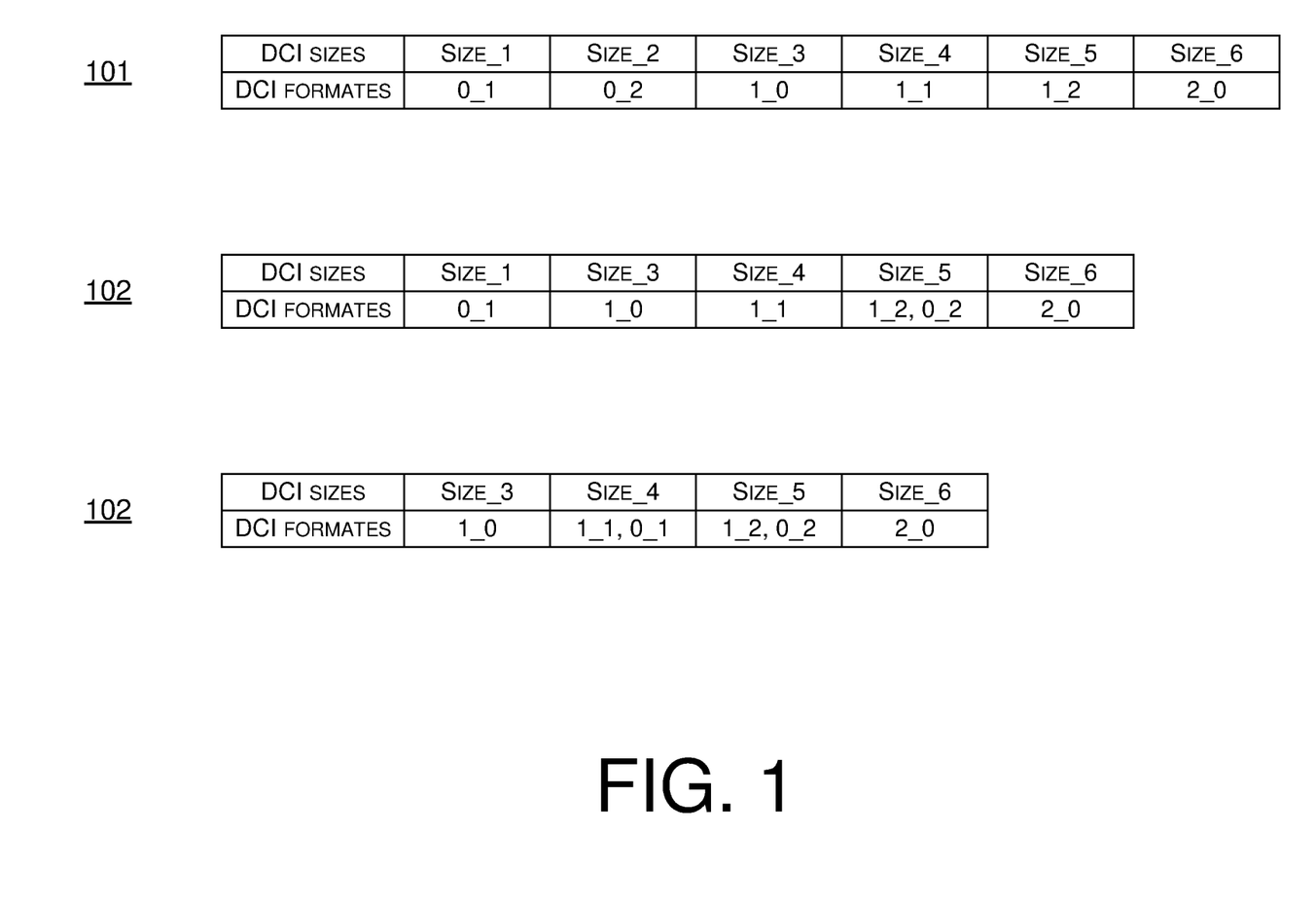
FIG. 1 is a diagram depicting example scenarios under schemes in accordance with implementations of the present disclosure.

FIG. 1 illustrates example scenarios under schemes in accordance with implementations of the present disclosure. Scenarios 101, 102 and 103 may involve a UE and a network node, which may be a part of a wireless communication network (e.g., an LTE network, an LTE-Advanced network, an LTE-Advanced Pro network, a 5G network, an NR network, an IoT network, an NB-IoT network or an IIoT network). The UE may be configured by the network node to monitor a plurality of DCI formats. The DCI formats may comprises, for example and without limitation, DCI format 0_1 and 0_2 for uplink PUSCH scheduling, DCI format 1_0, 1_1 and 1_2 for downlink PDSCH scheduling, and DCI format 2_0 for slot format indicator (SFI) information. Thus, as shown in scenario 101, the UE should monitor 5 DCI formats with CRC scrambled by C-RNTI and one DCI format with CRC scrambled by SFI-RNTI. Assuming that these 6 different DCI formats comprise 6 different DCI sizes (e.g., size_1-size_6). Therefore, the number of DCI sizes for UE's monitoring is greater than the DCI size budget (e.g., 3 for C-RNTI and 1 for any other RNTI). Hence, the DCI size alignment rule is required in this scenario.

For example, the network node may first align DCI format 0_2 and 1_2. The DCI format with smaller DCI size will be aligned with the DCI format with larger DCI size. Assume that size_5 is greater than size_2, then DCI format 0_2 and 1_2 will be aligned and will be both of size_5, as shown in scenario 102. After such alignment, the DCI sizes that the UE should monitor can be reduced to 4 DCI sizes scrambled by C-RNTI and 1 DCI size scrambled by SFI-RNTI. However, the number of monitored DCI sizes is still greater than the DCI size budget. Therefore, the network node may further align DCI format 0_1 and 1_1. The DCI format with smaller DCI size will be aligned with the DCI format with larger DCI size. Assume that size_4 is greater than size_1, then DCI format 0_1 and 1_1 will be aligned and will be both of size_4, as shown in scenario 103. After such alignment, the DCI sizes that the UE should monitor can be reduced to 3 DCI sizes scrambled by C-RNTI and 1 DCI size scrambled by SFI-RNTI, which is within the DCI sizes budget.

In some implementations, when performing the DCI size alignment rule, the network node may be configured to determine whether a first payload size of a first DCI format is less than a second payload size of a second DCI format. For example, the network node may determine whether a number of information bits in the first DCI format prior to adding the zero padding bits is less than the second payload size of the second DCI format. In an event that the first payload size of the first DCI format is less than the second payload size of the second DCI format, the network node may be configured to add a number of zero padding bits to the first DCI format until the first payload size of the first DCI format is equal to the second payload size of the second DCI format. For example, in an event that the number of information bits in a DCI format is less than 12 bits, zeros shall be appended to the DCI format until the payload size is equal to 12 bits. Then, the network node may be configured to transmit the first DCI format with the zero padding bits.

In some implementations, the first DCI format may comprise DCI format 0_1. The second DCI format may comprise DCI format 1_1. The network node may align the DCI size of DCI format 0_1 with the DCI size of DCI format 1_1 by adding a number of zero padding bits to DCI format 0_1.

In some implementations, the first DCI format may comprise DCI format 1_1. The second DCI format may comprise DCI format 0_1. The network node may align the DCI size of DCI format 1_1 with the DCI size of DCI format 0_1 by adding a number of zero padding bits to DCI format 1_1.

In some implementations, the first DCI format may be monitored in a UE-specific search space. The second DCI format may be monitored in the UE-specific search space for scheduling the same serving cell. The DCI size alignment rules or restrictions may be specified/pre-stored in the network node or semi-statically and/or dynamically configured by the network. For example, the DCI size alignment rules or restrictions may be triggered when high priority traffic (e.g., URLLC/eURLLC traffic) is available.

On the other hand, when a new DCI format is introduced, some restrictions or rules may be used/applied to differentiate the new DCI format from the existing DCI formats. Specifically, the network node may be configured to determine whether a first payload size of a first DCI format is equal to a second payload size of a second DCI format. In an event that the first payload size of the first DCI format is equal to the second payload size of the second DCI format, the network node may be configured to append at least one (e.g., one or multiple) zero padding bit to the first DCI format. The zero padding bit is used to differentiate the first DCI format from the second DCI format. Then, the network node may transmit the first DCI format with the zero padding bit. Accordingly, when a new DCI format is introduced, the network node may be configured to restrict the first payload size of the first DCI format to be different from the second payload size of the second DCI format.

In some implementations, the first DCI format (e.g., the newly introduced DCI format) may comprise at least one of DCI format 0_2 and DCI format 1_2. One or multiple bits of zero padding may be appended to DCI format 0_2 and/or DCI format 1_2. The second DCI format may comprise at least one of DCI format 0_0, DCI format 1_0, DCI format 0_1, and DCI format 1_1. The first DCI format may be monitored in a UE-specific search space. The second DCI format may be monitored in another/different or the same UE-specific search space.

At the UE side, the UE should be aware of the DCI sizes alignment rules in order to determine what DCI sizes it needs to monitor. The UE, based on the RRC configuration and the configured DCI formats, may first determine the DCI sizes it needs to monitor. In an event that it is greater than the DCI sizes budget, the UE may determine the DCI sizes it needs to monitor within the budget based on the DCI sizes alignment rules.

Specifically, the UE may be configured to receive a configuration configuring a plurality of DCI formats. The UE may be configured to determine whether a number of DCI sizes of the DCI formats is greater than a DCI size budget. In an event that the number of DCI sizes is greater than the DCI size budget, the UE may be configured to determine the DCI sizes to monitor within the DCI size budget according to a DCI size alignment rule. Then, the UE may monitor the DCI formats according to the determined DCI sizes.

In some implementations, the DCI size alignment rule may comprise aligning a first payload size of a first DCI format with a second payload size of a second DCI format. Thus, the UE may be configured to monitor the first DCI format and the second DCI format by the same DCI size. The first DCI format may comprise at least one zero padding bit.

In some implementations, the first DCI format may comprise DCI format 0_1. The second DCI format may comprise DCI format 1_1. The UE may be configured to monitor DCI format 0_1 by using the DCI size of DCI format 1_1. DCI format 0_1 may comprise at least one zero padding bit.

In some implementations, the first DCI format may comprise DCI format 1_1. The second DCI format may comprise DCI format 0_1. The UE may be configured to monitor DCI format 1_1 by using the DCI size of DCI format 0_1. DCI format 1_1 may comprise at least one zero padding bit.

In some implementations, the UE may be configured to monitor the first DCI format in a UE-specific search space. The UE may be configured to monitor the second DCI format in the UE-specific search space for scheduling the same serving cell.

Similarly, when a new DCI format is introduced, the UE may differentiate the new DCI format from the existing DCI formats according to some restrictions or rules. The DCI size of the new DCI format may be restricted to be different from the existing DCI formats (e.g., fallback DCI and non-fallback DCI). Specifically, the UE may be configured to differentiate a first DCI format from a second DCI format by at least one zero padding bit appended to the first DCI format. The first payload size of the first DCI format with the zero padding bit is different from the second payload size of the second DCI format. The first DCI format (e.g., the newly introduced DCI format) may comprise at least one of DCI format 0_2 and DCI format 1_2. One or multiple bits of zero padding may be appended to DCI format 0_2 and/or DCI format 1_2. The second DCI format may comprise at least one of DCI format 0_0, DCI format 1_0, DCI format 0_1, and DCI format 1_1. The UE may be configured to monitor the first DCI format in a UE-specific search space. The UE may be configured to monitor the second DCI format in another/different or the same UE-specific search space.

Therefore, the UE is not expected to monitor a first decoding candidate with DCI format 0_0/1_0 and a second candidate with DCI format 0_2/1_2, where the two decoding candidates are mapped to the same resource and the DCI formats 0_0/1_0 and 0_2/1_2 have the same size. The UE is not expected to monitor a first decoding candidate with DCI format 0_1/1_1 and a second candidate with DCI format 0_2/1_2, where the two decoding candidates are mapped to the same resource and the DCI formats 0_1/1_1 and 0_2/1_2 have the same size.

Illustrative Implementations

Figure 2:
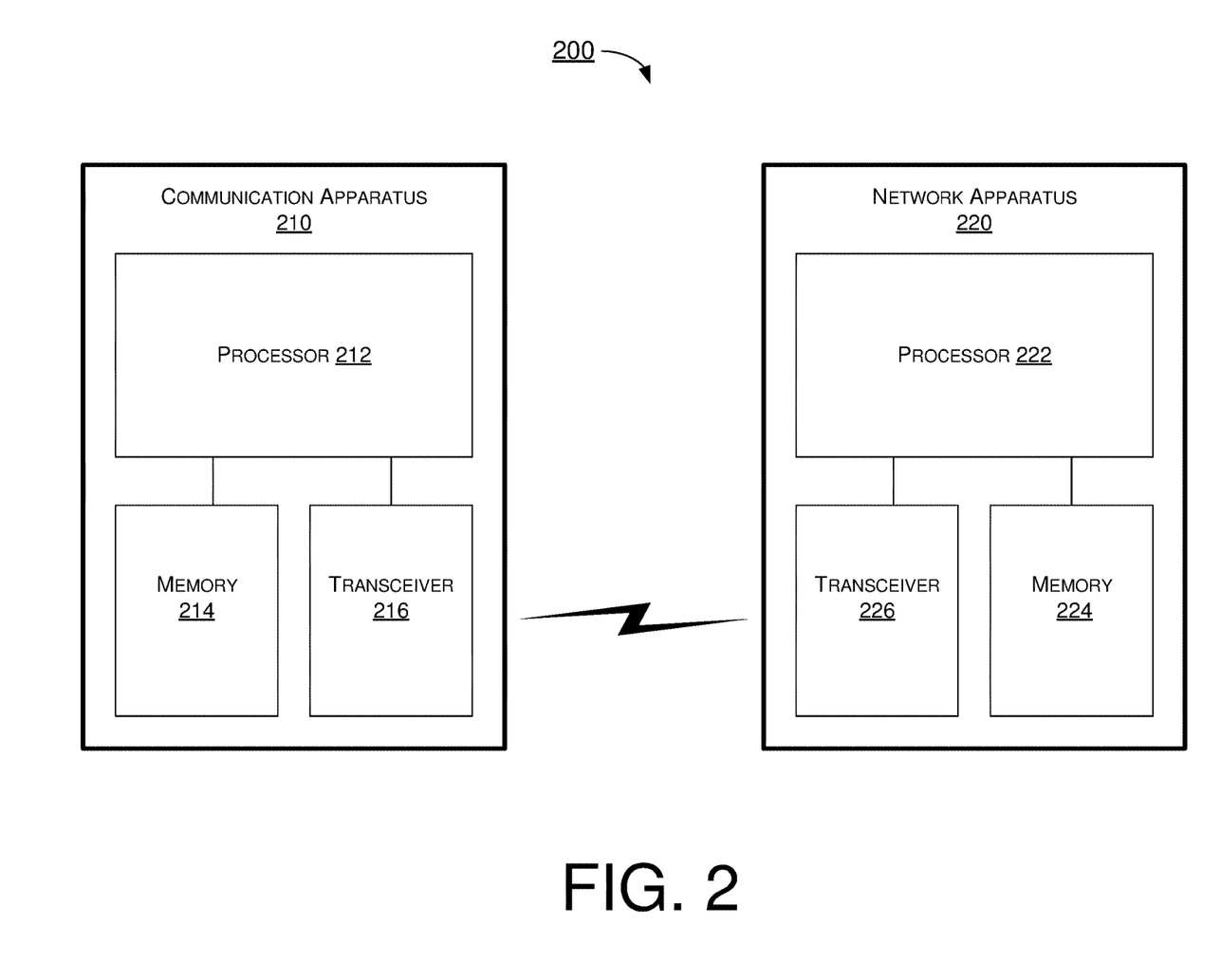
FIG. 2 is a block diagram of an example communication apparatus and an example network apparatus in accordance with an implementation of the present disclosure.

FIG. 2 illustrates an example communication apparatus 210 and an example network apparatus 220 in accordance with an implementation of the present disclosure. Each of communication apparatus 210 and network apparatus 220 may perform various functions to implement schemes, techniques, processes and methods described herein pertaining to DCI size alignment with respect to user equipment and network apparatus in wireless communications, including scenarios/mechanisms described above as well as processes 300, 400 and 500 described below.

Communication apparatus 210 may be a part of an electronic apparatus, which may be a UE such as a portable or mobile apparatus, a wearable apparatus, a wireless communication apparatus or a computing apparatus. For instance, communication apparatus 210 may be implemented in a smartphone, a smartwatch, a personal digital assistant, a digital camera, or a computing equipment such as a tablet computer, a laptop computer or a notebook computer. Communication apparatus 210 may also be a part of a machine type apparatus, which may be an IoT, NB-IoT, or IIoT apparatus such as an immobile or a stationary apparatus, a home apparatus, a wire communication apparatus or a computing apparatus. For instance, communication apparatus 210 may be implemented in a smart thermostat, a smart fridge, a smart door lock, a wireless speaker or a home control center. Alternatively, communication apparatus 210 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 210 may include at least some of those components shown in FIG. 2 such as a processor 212, for example. communication apparatus 210 may further include one or more other components not pertinent to the proposed scheme of the present disclosure (e.g., internal power supply, display device and/or user interface device), and, thus, such component(s) of communication apparatus 210 are neither shown in FIG. 2 nor described below in the interest of simplicity and brevity.

Network apparatus 220 may be a part of an electronic apparatus, which may be a network node such as a base station, a small cell, a router or a gateway. For instance, network apparatus 220 may be implemented in an eNodeB in an LTE, LTE-Advanced or LTE-Advanced Pro network or in a gNB in a 5G, NR, IoT, NB-IoT or IIoT network. Alternatively, network apparatus 220 may be implemented in the form of one or more IC chips such as, for example and without limitation, one or more single-core processors, one or more multi-core processors, or one or more RISC or CISC processors. Network apparatus 220 may include at least some of those components shown in FIG. 2 such as a processor 222, for example. Network apparatus 220 may further include one or more other components not pertinent to the proposed scheme of the present disclosure (e.g., internal power supply, display device and/or user interface device), and, thus, such component(s) of network apparatus 220 are neither shown in FIG. 2 nor described below in the interest of simplicity and brevity.

In one aspect, each of processor 212 and processor 222 may be implemented in the form of one or more single-core processors, one or more multi-core processors, or one or more CISC processors. That is, even though a singular term "a processor" is used herein to refer to processor 212 and processor 222, each of processor 212 and processor 222 may include multiple processors in some implementations and a single processor in other implementations in accordance with the present disclosure. In another aspect, each of processor 212 and processor 222 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 212 and processor 222 is a special-purpose machine specifically designed, arranged and configured to perform specific tasks including power consumption reduction in a device (e.g., as represented by communication apparatus 210) and a network (e.g., as represented by network apparatus 220) in accordance with various implementations of the present disclosure.

In some implementations, communication apparatus 210 may also include a transceiver 216 coupled to processor 212 and capable of wirelessly transmitting and receiving data. In some implementations, communication apparatus 210 may further include a memory 214 coupled to processor 212 and capable of being accessed by processor 212 and storing data therein. In some implementations, network apparatus 220 may also include a transceiver 226 coupled to processor 222 and capable of wirelessly transmitting and receiving data. In some implementations, network apparatus 220 may further include a memory 224 coupled to processor 222 and capable of being accessed by processor 222 and storing data therein. Accordingly, communication apparatus 210 and network apparatus 220 may wirelessly communicate with each other via transceiver 216 and transceiver 226, respectively. To aid better understanding, the following description of the operations, functionalities and capabilities of each of communication apparatus 210 and network apparatus 220 is provided in the context of a mobile communication environment in which communication apparatus 210 is implemented in or as a communication apparatus or a UE and network apparatus 220 is implemented in or as a network node of a communication network.

In some implementations, processor 222 may be configured to configure a plurality of DCI formats to communication apparatus 210 for its monitoring via a RRC configuration. Processor 222 may be configured with a DCI size budget. Processor 222 may be configured to determine whether a number of DCI sizes that it configured for processor 212's monitoring is greater than the DCI size budget. In an event that the number of DCI sizes is greater than the DCI size budget, processor 222 may be configured to apply/use a DCI size alignment rule to reduce the total number of different DCI sizes.

In some implementations, when performing the DCI size alignment rule, processor 222 may be configured to determine whether a first payload size of a first DCI format is less than a second payload size of a second DCI format. For example, processor 222 may determine whether a number of information bits in the first DCI format prior to adding the zero padding bits is less than the second payload size of the second DCI format. In an event that the first payload size of the first DCI format is less than the second payload size of the second DCI format, processor 222 may be configured to add a number of zero padding bits to the first DCI format until the first payload size of the first DCI format is equal to the second payload size of the second DCI format In some implementations, processor 222 may align the DCI size of DCI format 0_1 with the DCI size of DCI format 1_1 by adding a number of zero padding bits to DCI format 0_1.

In some implementations, processor 222 may align the DCI size of DCI format 1_1 with the DCI size of DCI format 0_1 by adding a number of zero padding bits to DCI format 1_1.

In some implementations, when a new DCI format is introduced, processor 222 may use/apply some restrictions or rules to differentiate the new DCI format from the existing DCI formats. Specifically, processor 222 may be configured to determine whether a first payload size of a first DCI format is equal to a second payload size of a second DCI format. In an event that the first payload size of the first DCI format is equal to the second payload size of the second DCI format, processor 222 may be configured to append at least one (e.g., one or multiple) zero padding bit to the first DCI format. The zero padding bit is used to differentiate the first DCI format from the second DCI format. Then, processor 222 may transmit, via transceiver 226, the first DCI format with the zero padding bit.

In some implementations, processor 212 should be aware of the DCI sizes alignment rules in order to determine what DCI sizes it needs to monitor. Processor 212, based on the RRC configuration and the configured DCI formats, may first determine the DCI sizes it needs to monitor. In an event that it is greater than the DCI sizes budget, processor 212 may determine the DCI sizes it needs to monitor within the budget based on the DCI sizes alignment rules.

In some implementations, processor 212 may be configured to receive, via transceiver 216, a configuration configuring a plurality of DCI formats. Processor 212 may be configured to determine whether a number of DCI sizes of the DCI formats is greater than a DCI size budget. In an event that the number of DCI sizes is greater than the DCI size budget, processor 212 may be configured to determine the DCI sizes to monitor within the DCI size budget according to a DCI size alignment rule. Then, processor 212 may monitor the DCI formats according to the determined DCI sizes.

In some implementations, the DCI size alignment rule may comprise aligning a first payload size of a first DCI format with a second payload size of a second DCI format. Thus, processor 212 may be configured to monitor the first DCI format and the second DCI format by the same DCI size. The first DCI format may comprise at least one zero padding bit.

In some implementations, processor 212 may be configured to monitor DCI format 0_1 by using the DCI size of DCI format 1_1. DCI format 0_1 may comprise at least one zero padding bit.

In some implementations, processor 212 may be configured to monitor DCI format 1_1 by using the DCI size of DCI format 0_1. DCI format 1_1 may comprise at least one zero padding bit.

In some implementations, processor 212 may be configured to monitor the first DCI format in a UE-specific search space. Processor 212 may be configured to monitor the second DCI format in the UE-specific search space for scheduling the same serving cell.

In some implementations, when a new DCI format is introduced, processor 212 may differentiate the new DCI format from the existing DCI formats according to some restrictions or rules. Specifically, processor 212 may be configured to differentiate a first DCI format from a second DCI format by at least one zero padding bit appended to the first DCI format. The first payload size of the first DCI format with the zero padding bit is different from the second payload size of the second DCI format. Processor 212 may be configured to monitor the first DCI format in a UE-specific search space. Processor 212 may be configured to monitor the second DCI format in another/different or the same UE-specific search space.

In some implementations, processor 212 is not expected to monitor a first decoding candidate with DCI format 0_0/1_0 and a second candidate with DCI format 0_2/1_2, where the two decoding candidates are mapped to the same resource and the DCI formats 0_0/1_0 and 0_2/1_2 have the same size. Processor 212 is not expected to monitor a first decoding candidate with DCI format 0_1/1_1 and a second candidate with DCI format 0_2/1_2, where the two decoding candidates are mapped to the same resource and the DCI formats 0_1/1_1 and 0_2/1_2 have the same size.

Illustrative Processes

Figure 3:
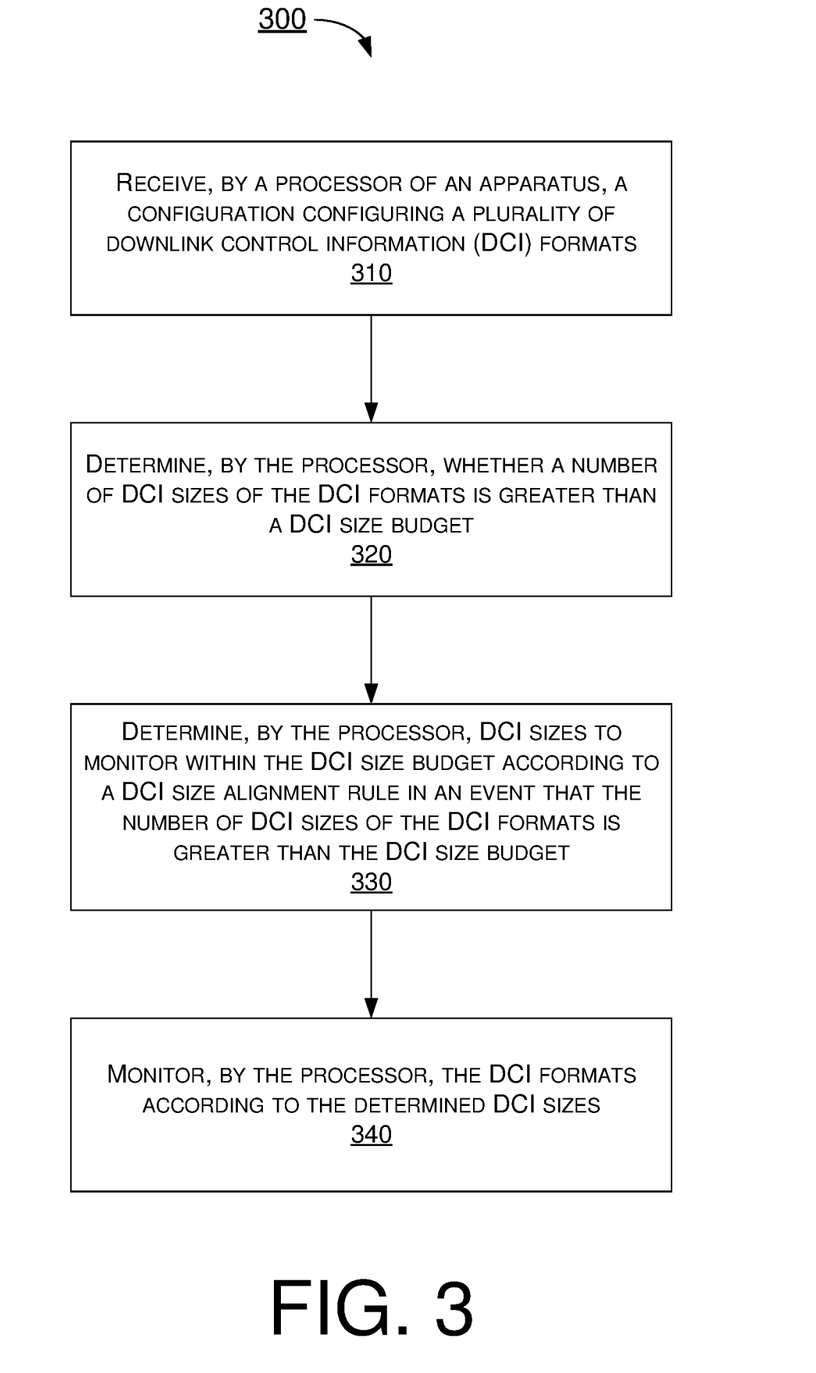
FIG. 3 is a flowchart of an example process in accordance with an implementation of the present disclosure.

FIG. 3 illustrates an example process 300 in accordance with an implementation of the present disclosure. Process 300 may be an example implementation of above scenarios/schemes, whether partially or completely, with respect to DCI size alignment with the present disclosure. Process 300 may represent an aspect of implementation of features of communication apparatus 210. Process 300 may include one or more operations, actions, or functions as illustrated by one or more of blocks 310, 320, 330 and 340. Although illustrated as discrete blocks, various blocks of process 300 may be divided into additional blocks, combined into fewer blocks, or eliminated, depending on the desired implementation. Moreover, the blocks of process 300 may executed in the order shown in FIG. 3 or, alternatively, in a different order. Process 300 may be implemented by communication apparatus 210 or any suitable UE or machine type devices. Solely for illustrative purposes and without limitation, process 300 is described below in the context of communication apparatus 210. Process 300 may begin at block 310.

At 310, process 300 may involve processor 212 of apparatus 210 receiving a configuration configuring a plurality of DCI formats. Process 300 may proceed from 310 to 320.

At 320, process 300 may involve processor 212 determining whether a number of DCI sizes of the DCI formats is greater than a DCI size budget. Process 300 may proceed from 320 to 330.

At 330, process 300 may involve processor 212 determining DCI sizes to monitor within the DCI size budget according to a DCI size alignment rule in an event that the number of DCI sizes is greater than the DCI size budget. Process 300 may proceed from 330 to 340.

At 340, process 300 may involve processor 212 monitoring the DCI formats according to the determined DCI sizes.

In some implementations, the DCI size alignment rule may comprise aligning a first payload size of a first DCI format with a second payload size of a second DCI format.

In some implementations, the first DCI format may comprise a DCI format 0_1. The second DCI format may comprise a DCI format 1_1.

In some implementations, the first DCI format may comprise a DCI format 1_1. The second DCI format may comprise a DCI format 0_1.

In some implementations, process 300 may involve processor 212 monitoring the first DCI format and the second DCI format by a same DCI size. The first DCI format may comprise at least one zero padding bit.

In some implementations, process 300 may involve processor 212 monitoring the first DCI format in a UE-specific search space. Process 300 may further involve processor 212 monitoring the second DCI format in the UE-specific search space for scheduling a same serving cell.

In some implementations, process 300 may involve processor 212 differentiating a first DCI format from a second DCI format by a zero padding bit appended to the first DCI format. A first payload size of the first DCI format with the zero padding bit may be different from a second payload size of the second DCI format.

In some implementations, the first DCI format may comprise at least one of a DCI format 0_2 and a DCI format 1_2. The second DCI format may comprise at least one of a DCI format 0_0, a DCI format 1_0, a DCI format 0_1, and a DCI format 1_1.

In some implementations, process 300 may involve processor 212 monitoring the first DCI format in a UE-specific search space. Process 300 may further involve processor 212 monitoring the second DCI format in another UE-specific search space.

Figure 4:
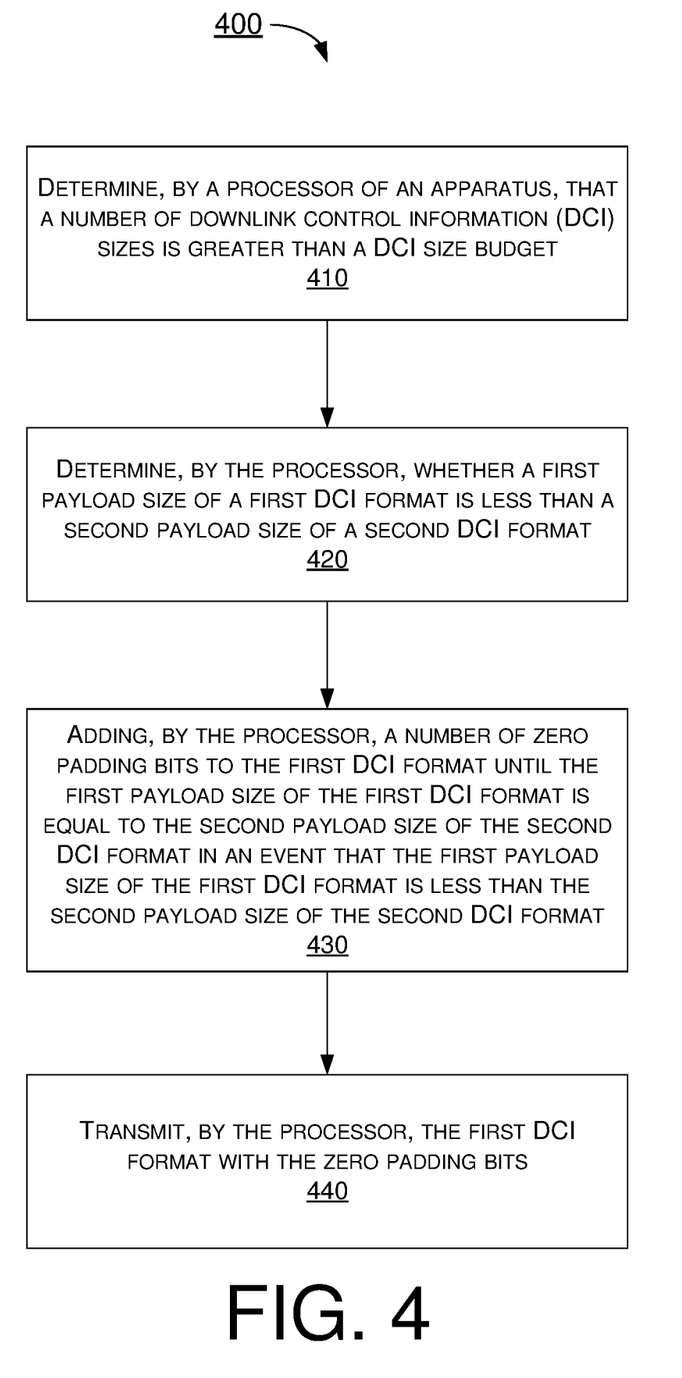
FIG. 4 is a flowchart of an example process in accordance with an implementation of the present disclosure.

FIG. 4 illustrates an example process 400 in accordance with an implementation of the present disclosure. Process 400 may be an example implementation of above scenarios/schemes, whether partially or completely, with respect to DCI size alignment with the present disclosure. Process 400 may represent an aspect of implementation of features of communication apparatus 210. Process 400 may include one or more operations, actions, or functions as illustrated by one or more of blocks 410, 420, 430 and 440. Although illustrated as discrete blocks, various blocks of process 400 may be divided into additional blocks, combined into fewer blocks, or eliminated, depending on the desired implementation. Moreover, the blocks of process 400 may executed in the order shown in FIG. 4 or, alternatively, in a different order. Process 400 may be implemented by communication apparatus 210 or any suitable UE or machine type devices. Solely for illustrative purposes and without limitation, process 400 is described below in the context of communication apparatus 210. Process 400 may begin at block 410.

At 410, process 400 may involve processor 212 of apparatus 210 determining that a number of DCI sizes is greater than a DCI size budget. Process 400 may proceed from 410 to 420.

At 420, process 400 may involve processor 212 determining whether a first payload size of a first DCI format is less than a second payload size of a second DCI format. Process 400 may proceed from 420 to 430.

At 430, process 400 may involve processor 212 adding a number of zero padding bits to the first DCI format until the first payload size of the first DCI format is equal to the second payload size of the second DCI format in an event that the first payload size of the first DCI format is less than the second payload size of the second DCI format. Process 400 may proceed from 430 to 440.

At 440, process 400 may involve processor 212 transmitting the first DCI format with the zero padding bits.

In some implementations, the first DCI format may comprise a DCI format 0_1. The second DCI format comprises a DCI format 1_1.

In some implementations, the first DCI format may comprise a DCI format 1_1. The second DCI format comprises a DCI format 0_1.

In some implementations, process 400 may involve processor 212 determining whether a number of information bits in the first DCI format prior to adding the zero padding bits is less than the second payload size of the second DCI format.

In some implementations, the first DCI format may be monitored in a UE-specific search space. The second DCI format may be monitored in the UE-specific search space for scheduling a same serving cell.

Figure 5:
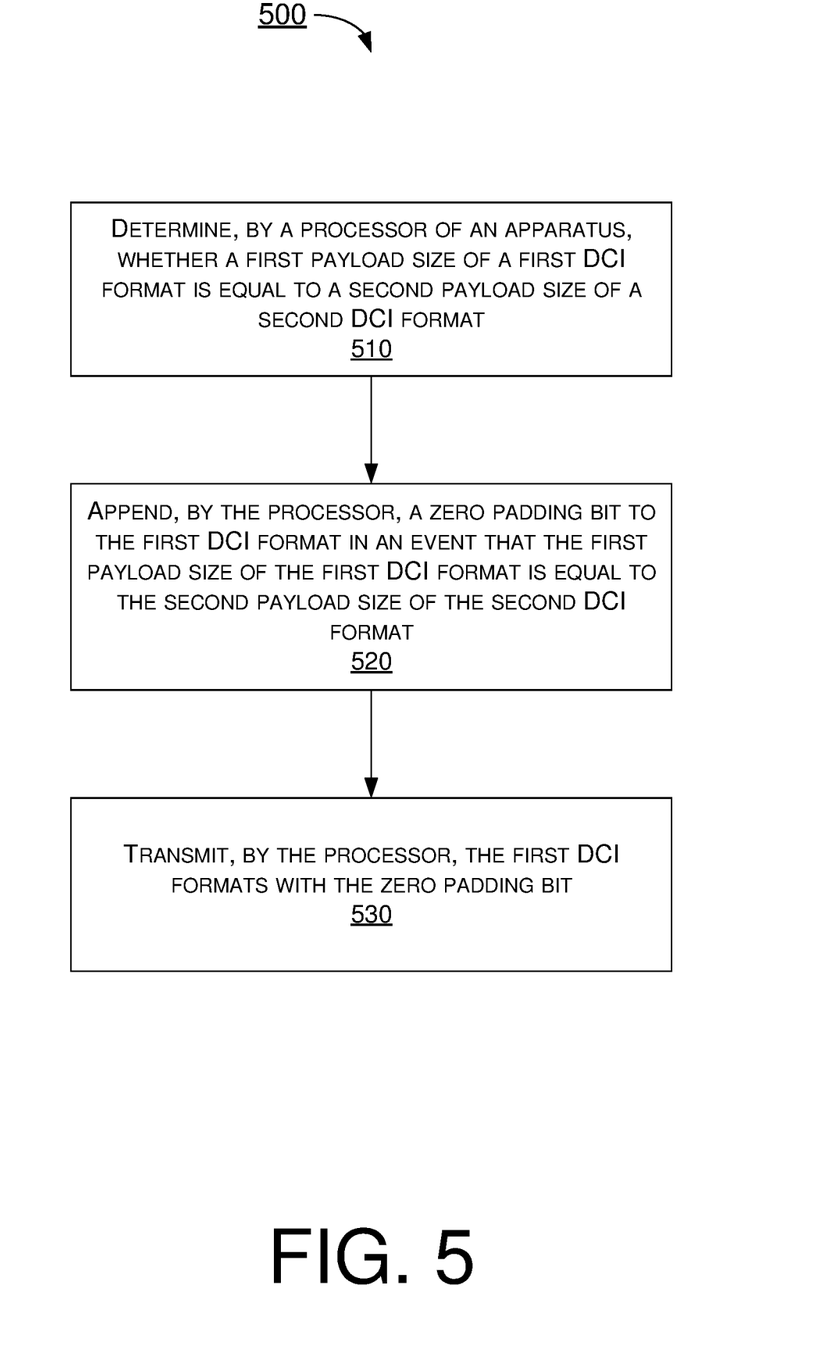
FIG. 5 is a flowchart of an example process in accordance with an implementation of the present disclosure.

FIG. 5 illustrates an example process 500 in accordance with an implementation of the present disclosure. Process 500 may be an example implementation of above scenarios/schemes, whether partially or completely, with respect to DCI size alignment with the present disclosure. Process 500 may represent an aspect of implementation of features of communication apparatus 210. Process 500 may include one or more operations, actions, or functions as illustrated by one or more of blocks 510, 520 and 530. Although illustrated as discrete blocks, various blocks of process 500 may be divided into additional blocks, combined into fewer blocks, or eliminated, depending on the desired implementation. Moreover, the blocks of process 500 may executed in the order shown in FIG. 5 or, alternatively, in a different order. Process 500 may be implemented by communication apparatus 210 or any suitable UE or machine type devices. Solely for illustrative purposes and without limitation, process 500 is described below in the context of communication apparatus 210. Process 500 may begin at block 510.

At 510, process 500 may involve processor 212 of apparatus 210 determining whether a first payload size of a first DCI format is equal to a second payload size of a second DCI format. Process 500 may proceed from 510 to 520.

At 520, process 500 may involve processor 212 appending a zero padding bit to the first DCI format in an event that the first payload size of the first DCI format is equal to the second payload size of the second DCI format. Process 500 may proceed from 520 to 530.

At 530, process 500 may involve processor 212 transmitting the first DCI format with the zero padding bit.

In some implementations, the first DCI format may comprise at least one of a DCI format 0_2 and a DCI format 1_2. The second DCI format may comprise at least one of a DCI format 0_0, a DCI format 1_0, a DCI format 0_1, and a DCI format 1_1.

In some implementations, the first DCI format may be monitored in a UE-specific search space. The second DCI format may be monitored in another UE-specific search space.

In some implementations, the zero padding bit may be used to differentiate the first DCI format from the second DCI format.

In some implementations, process 500 may involve processor 212 restricting the first payload size of the first DCI format to be different from the second payload size of the second DCI format.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   aligning, by a processor of an apparatus according to a downlink control information (DCI) size alignment rule, a first payload size of a first DCI format with a second payload size of a second DCI format,
   wherein, responsive to the first DCI format comprising a DCI format 0_1, the second DCI format comprises a DCI format 1_1, and
   wherein, responsive to the first DCI format comprising a DCI format 1_1, the second DCI format comprises a DCI format 0_1.

2. The method of claim 1, further comprising:
   monitoring, by the processor, the first DCI format and the second DCI format by a same DCI size,
   wherein the first DCI format comprises at least one zero padding bit.

3. The method of claim 1, further comprising:
   monitoring, by the processor, the first DCI format in a user equipment (UE)-specific search space; and
   monitoring, by the processor, the second DCI format in the UE-specific search space for scheduling a same serving cell.

4. The method of claim 1, further comprising:
   differentiating, by the processor, the first DCI format from the second DCI format by a zero padding bit appended to the first DCI format,
   wherein a first payload size of the first DCI format with the zero padding bit is different from a second payload size of the second DCI format.

5. The method of claim 4, wherein the first DCI format comprises at least one of a DCI format 0_2 and a DCI format 1_2.

6. The method of claim 4, wherein the second DCI format comprises at least one of a DCI format 0_0, a DCI format 1_0, a DCI format 0_1, and a DCI format 1_1.

7. The method of claim 4, further comprising:
   monitoring, by the processor, the first DCI format in a user equipment (UE)-specific search space; and
   monitoring, by the processor, the second DCI format in another UE-specific search space.

8. A method, comprising:
   determining, by a processor of an apparatus, that a number of downlink control information (DCI) sizes is greater than a DCI size budget;
   determining, by the processor, whether a first payload size of a first DCI format is less than a second payload size of a second DCI format;
   adding, by the processor according to a DCI size alignment rule, a number of zero padding bits to the first DCI format until the first payload size of the first DCI format is equal to the second payload size of the second DCI format in an event that the first payload size of the first DCI format is less than the second payload size of the second DCI format and that the number of DCI sizes is greater than the DCI size budget; and
   transmitting, by the processor, the first DCI format with the zero padding bits,
   wherein the DCI size alignment rule comprises aligning a first payload size of a first DCI format with a second payload size of a second DCI format,
   wherein, responsive to the first DCI format comprising a DCI format 0_1, the second DCI format comprises a DCI format 1_1, and
   wherein, responsive to the first DCI format comprising a DCI format 1_1, the second DCI format comprises a DCI format 0_1.

9. The method of claim 8, wherein the determining of whether a first payload size of a first DCI format is less than a second payload size of a second DCI format comprises determining whether a number of information bits in the first DCI format prior to adding the zero padding bits is less than the second payload size of the second DCI format.

10. The method of claim 8, wherein the first DCI format is monitored in a user equipment (UE)-specific search space, and wherein the second DCI format is monitored in the UE-specific search space for scheduling a same serving cell.

11. A method, comprising:
   determining, by a processor of an apparatus, whether a first payload size of a first downlink control information (DCI) format is equal to a second payload size of a second DCI format;
   appending, by the processor according to a DCI size alignment rule, a zero padding bit to the first DCI format in an event that the first payload size of the first DCI format is equal to the second payload size of the second DCI format; and
   transmitting, by the processor, the first DCI format with the zero padding bit,
   wherein the DCI size alignment rule comprises aligning five different payload sizes to respective three different payload sizes in an event that the number of DCI sizes is greater than 4 and that the DCI size budget is less than 4.

12. The method of claim 11, wherein the first DCI format comprises at least one of a DCI format 0_2 and a DCI format 1_2.

13. The method of claim 11, wherein the second DCI format comprises at least one of a DCI format 0_0, a DCI format 1_0, a DCI format 0_1, and a DCI format 1_1.

14. The method of claim 11, wherein the first DCI format is monitored in a user equipment (UE)-specific search space, and wherein the second DCI format is monitored in another UE-specific search space.

15. The method of claim 11, wherein the zero padding bit is used to differentiate the first DCI format from the second DCI format.

16. The method of claim 11, further comprising:
   restricting, by the processor, the first payload size of the first DCI format to be different from the second payload size of the second DCI format.

* * * * *